United States Patent [19]

Dittrich

[11] Patent Number: 4,800,536
[45] Date of Patent: Jan. 24, 1989

[54] EXTRUDER

[75] Inventor: Gerd Dittrich, Völklingen, Fed. Rep. of Germany

[73] Assignee: Saar-Hartimetall und Werkzeuge GmbH, Volkingen, Fed. Rep. of Germany

[21] Appl. No.: 57,782

[22] Filed: Jun. 3, 1987

[30] Foreign Application Priority Data

Jun. 16, 1986 [DE] Fed. Rep. of Germany ....... 3620267

[51] Int. Cl.⁴ ............................................... B29C 1/06
[52] U.S. Cl. ...................................... 366/78; 403/341
[58] Field of Search ................. 366/78, 79, 80, 81–90, 366/279, 318, 331, 342, 348, 349; 403/341

[56] References Cited

U.S. PATENT DOCUMENTS

| | | | |
|---|---|---|---|
| 3,606,407 | 9/1971 | Pendergast | 403/341 |
| 4,175,405 | 11/1979 | Smith | 403/341 |
| 4,192,616 | 3/1980 | Spanier | 366/79 |
| 4,249,877 | 2/1981 | Machen | 366/79 |
| 4,416,563 | 11/1983 | Zemke | 403/341 |

*Primary Examiner*—Robert W. Jenkins
*Attorney, Agent, or Firm*—Peter K. Kontler

[57] ABSTRACT

An extruder for plastic materials wherein an end portion of the extruder screw extends from the extrusion cylinder and is coupled to the adjacent end portion of the drive shaft by a U-shaped coupling element which partially surrounds the two end portions and by a claw-shaped coupling element which overlies flats on the end portions of the extruder screw and drive shaft and is secured to the U-shaped coupling element by a screw. The flat on the end portion of the extruder screw is inclined with reference to the axis of the extruder screw if the shaft is to transmit torque to and to reciprocate the extruder screw. A U-shaped clamping device is used to secure the U-shaped coupling element to the end portion of the shaft.

10 Claims, 3 Drawing Sheets

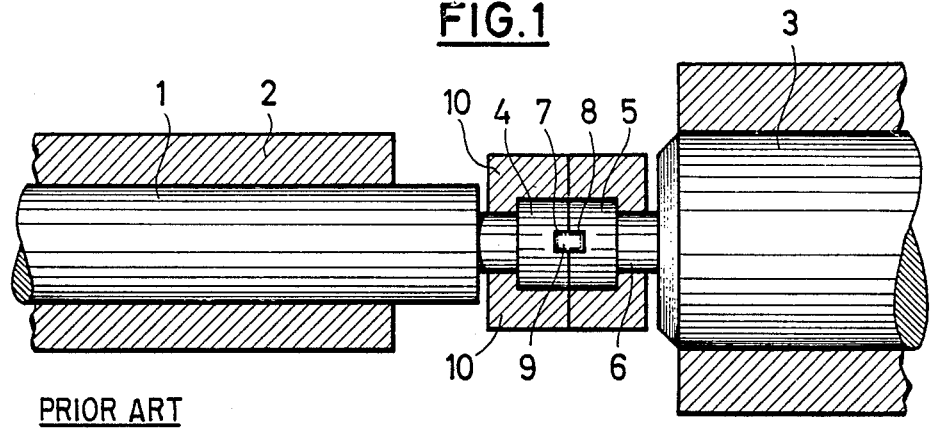
FIG. 1
PRIOR ART
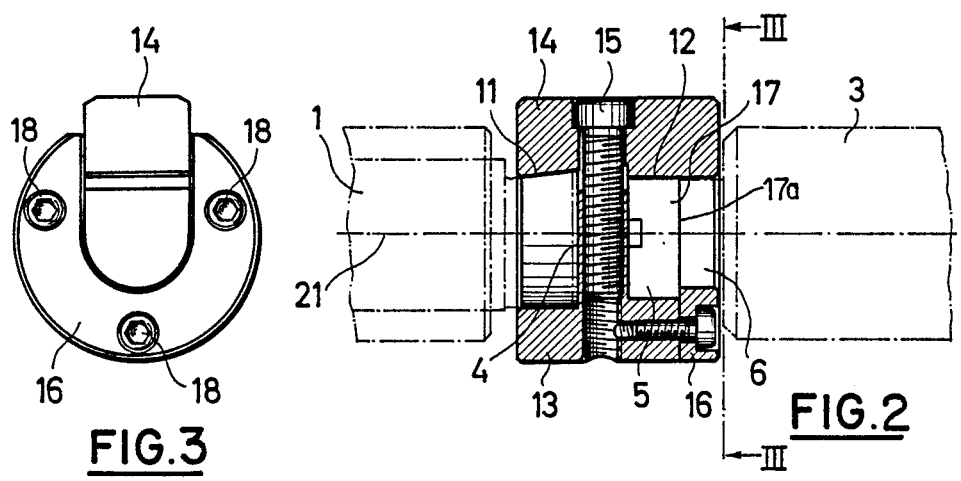
FIG. 3
FIG. 2
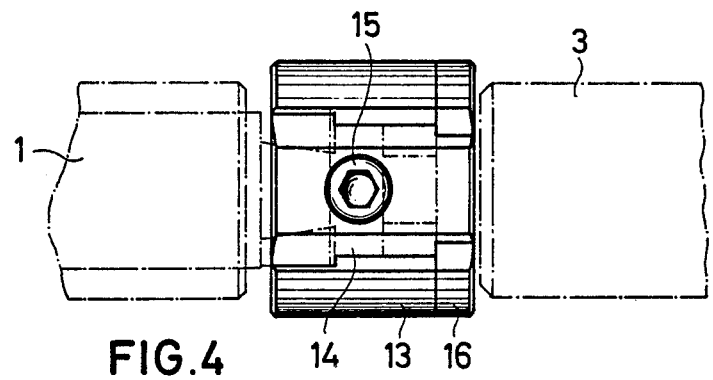
FIG. 4

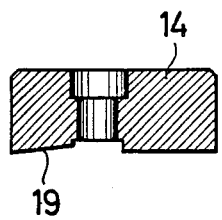
FIG.11  FIG.12
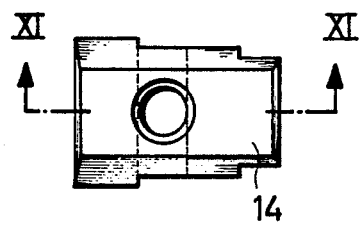
FIG.10
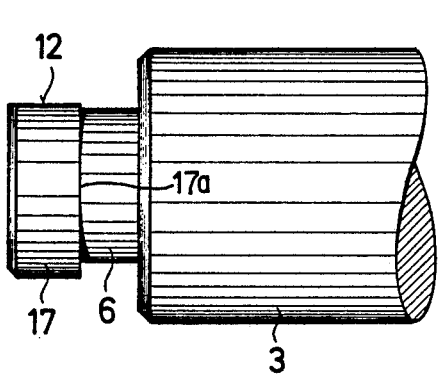
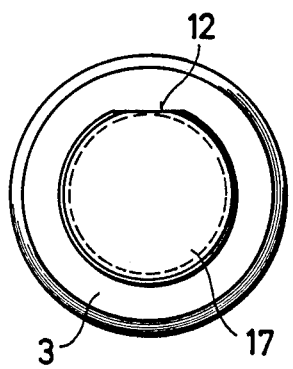
FIG.13  FIG.14

EXTRUDER

BACKGROUND OF THE INVENTION

The invention relates to extruders in general, especially to extruders which can be used to make shaped articles from plastic material. More particularly, the invention relates to improvements in connections between the screw of an extruder and a drive which serves to impart to the screw a rotary and, if necessary, a reciprocatory movement.

It is well known to plasticize synthetic plastic powders or granulates in an extrusion cylinder wherein the material is heated while being acted upon by an extruder screw. The latter receives motion from a drive whose output element is coupled to the screw. As a rule, the end faces of neighboring end portions of the screw and output element are formed with grooves for a torque-transmitting wedge, and the end portions are then confined in a two-piece sleeve. A drawback of such couplings is that they are prone to malfunction. The useful life of the wedge is short and the end portion of the screw is likely to crack or break in response to the application of forces which arise if the axis of the output element does not coincide with the axis of the screw.

OBJECTS AND SUMMARY OF THE INVENTION

An object of the invention is to provide an extruder wherein the screw receives torque and/or other motion in a novel and improved way.

Another object of the invention is to provide a novel and improved coupling between the screw and the output element of the drive means in an extruder for plastic materials.

A further object of the invention is to provide a coupling which can stand prolonged use and which is less likely to damage or destroy the screw than heretofore known couplings.

An additional object of the invention is to provide an extruder which can employ a conventional, or a slightly modified conventional, drive for transmission of motion to the screw.

Still another object of the invention is to provide a novel and improved screw for use in the above outlined extruder.

A further object of the invention is to provide a novel and improved method of transmitting motion to the screw in the cylinder of an extruder for plasticized materials.

The invention is embodied in an extruder, particularly for plastic materials, which comprises a screw having a first end portion provided with a first flat, drive means for the screw including a motion transmitting member having a second end portion provided with a second flat adjacent the first flat, and means for coupling the end portions to each other. The coupling means includes a first coupling element which can resemble a claw and overlies and abuts the two flats, a second coupling element which can resemble or constitute a U-shaped body and partially surrounds the two end portions, and means for fastening the coupling elements to each other.

The screw is rotatable about a predetermined axis, and the motion transmitting member of the drive means can constitute a rotary shaft whose axis coincides with the axis of the screw. The fastening means can be located between the end portions of the screw and shaft; for example, one of the coupling elements can have a tapped bore and the fastening means can include a fastener having an externally threaded shank in the tapped bore of the one coupling element.

One of the flats (particularly the first flat) can be inclined with reference to the predetermined axis.

The shaft can include an enlarged portion in the region of the second end portion, and the coupling means can further comprise a clamping device which abuts the enlarged portion of the shaft and means (such as a set of screws or bolts) for releasably securing the clamping device to one of the coupling elements. The enlarged portion can form part of the second end portion, and the shaft can be provided with a circumferentially extending shoulder adjacent the enlarged portion. The clamping device then abuts the shoulder and the securing means can include means for connecting the clamping device to the U-shaped coupling element.

The drive means can include motor means for reciprocating and/or rotating the shaft.

The novel features which are considered as characteristic of the invention are set forth in particular in the appended claims. The improved extruder itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary schematic longitudinal sectional view of a conventional extruder;

FIG. 2 is a fragmentary schematic partly longitudinal sectional view of an extruder which embodies the invention;

FIG. 3 is an end elevational view of the coupling of the improved extruder as seen in the direction of arrows from the line III—III of FIG. 2;

FIG. 4 is a plan view of the structure which is shown in FIG. 2;

FIG. 10 is a plan view of the other coupling element;

FIG. 11 is a sectional view as seen in the direction of arrows from the line XI—XI of FIG. 10;

FIG. 12 is an end elevational view of the other coupling element as seen from the left-hand side of FIG. 10;

FIG. 13 is a fragmentary side elevational view of the motion transmitting member of the drive means in the extruder which is shown in FIG. 2; and FIG. 14 is an end elevational view as seen from the left-hand side of FIG. 13.

DESCRIPTION OF THE PREFERRED EMBODIMENTS

Figure 5:
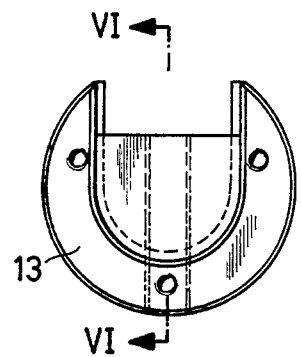
FIG. 5 is an end elevational view of the U-shaped coupling element of the coupling which is shown in FIGS. 2-4.

FIG. 1 shows a portion of a conventional extruder wherein a rotary extruder screw 1 is installed in an extrusion cylinder 2 and has an enlarged end portion 4 abutting the enlarged end portion 5 of a shaft 6 constituting the output element of a drive 3 which merely rotates the screw 1 or imparts to the screw 1 a combined rotary and reciprocatory movement, depending on the nature of the extruder. The abutting end faces of the enlarged portions 4, 5 have aligned recesses in the form of grooves 7, 8 which receive a torque transmitting wedge 9. The end portions are surrounded by a two-piece sleeve whose halves 10 are separably secured to each other in a manner not shown in FIG. 1.

A drawback of such conventional extruders is that the coupling including the halves 10 of the sleeve and the wedge 9 is often damaged or destroyed in response to slight misalignment of the screw 1 and shaft 6. The wedge 9 is likely to break in response to the application of relatively small forces. Furthermore, the enlarged end portion 4 of the screw 1 is likely to crack or break in response to the application of relatively small forces which necessitates an interruption of the operation and the installation of a fresh screw.

FIGS. 2 to 4 show an extruder which embodies the invention and wherein the end portions 4, 5 of the extruder screw 1 and motion transmitting shaft 6 have neighboring flats 11, 12. The axis 21 of the screw 1 coincides with the axis of the shaft 6. The end faces of the end portions 4, 5 do not have any grooves and the coupling 9, 10, 10 of FIG. 1 is replaced with a coupling including a substantially U-shaped coupling element 13 which surrounds the end portions 4, 5 in part (from below, as seen in FIG. 2), a claw-shaped coupling element 14 which overlies and abuts the flats 11, 12 of the end portions 4, 5, and fastening means in the form of a screw 15 having a threaded shank extending into a tapped bore provided in a tubular extension of the coupling element 13 between the end portions 4 and 5. The coupling further comprises a substantially U-shaped clamping device 16 which abuts a shoulder 17a of an enlarged portion 17 forming part of the shaft 6 and of the end portion 5. Several securing means in the form of screws 18 or other suitable connectors are provided to separably connect the clamping device 16 to one of the coupling elements 13, 14. In the illustrated embodiment, the screws 18 connect the clamping device 16 to the adjacent end face of the coupling element 13. This, combined with the tubular extension of the coupling element 13 between the end portions 4, 5, reliably secures the coupling element 13 to the end portion 5. The coupling element 14 establishes the connection with the end portion 4 because it overlies the flats 11, 12 and because the flat 11 is inclined with reference to the axis 21 of the screw 1. Such inclination of the flat 11 is particularly desirable if the drive means 3 is designed to rotate the screw 1 as well as to reciprocate the screw in the extrusion cylinder.

The flats 11 and 12 can be provided on the screws and drive shafts of existing extruders so that the conventional coupling of FIG. 1 can be replaced with the coupling of FIGS. 2 to 4. For example, and as regards the flat 12, it is merely necessary to remove some material from the end portion of the shaft 6 in a manner as best shown in FIGS. 13 and 14 so that the resulting flat 12 is tangential to the smaller-diameter portion of the shaft 6 adjacent the enlarged portion 17.

It will be noted that the end portion 4 of the screw 1 in the improved extruder need not be enlarged (compare with the enlarged end portion 4 of the screw 1 which is shown in FIG. 1), i.e., it is merely necessary to form the inclined flat 11 and the screw 1 is ready for torque-receiving attachment to the motion transmitting member 6 of the drive means 3. The absence of an enlarged end portion on an extruder screw, especially a screw which is made of a hard metal, is desirable for a number of reasons. Those surfaces of the coupling element 14 which are adjacent the flats 11 and 12 are preferably oriented and finished with a view to ensure a reliable and large-area contact with the flats when the fastener 15 is applied to connect the coupling elements 13 and 14 to each other.

The clamping device 16 is optional but desirable and advantageous because it renders it possible to convert an existing drive 3 and its motion transmitting member 6 for use in the improved extruder, i.e., for attachment of the coupling element 13 to the end portion 5. Moreover, the clamping device 16 ensures that the coupling element 13 is properly positioned and held on the end portion 5 of the member 6.

Figure 6:
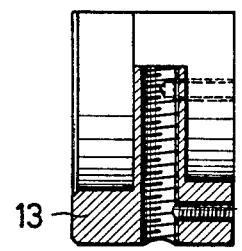
FIG. 6 is a sectional view as seen in the direction of arrows from the line VI—VI of FIG. 5.
Figure 7:
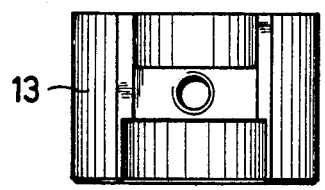
FIG. 7 is a plan view of the coupling element which is shown in FIG. 5.
Figure 8:
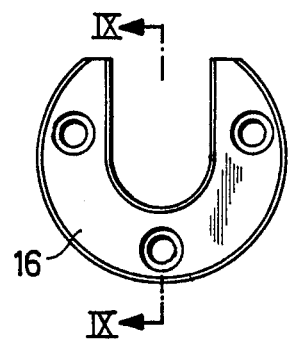
FIG. 8 is an end elevational view of a clamping device which forms part of the coupling in the extruder of FIG. 2.
Figure 9:
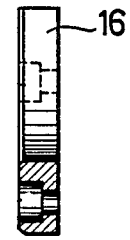
FIG. 9 is a sectional view as seen in the direction of arrows from the line IX—IX of FIG. 8.

FIGS. 5, 6 and 7 show the details of the coupling element 13 and its tapped bore for the shank of the fastener 15. FIGS. 8 and 9 show the clamping device 16, and FIGS. 10 to 12 show the claw-shaped coupling element 14. The reference character 19 denotes that surface of the coupling element 14 which abuts the flat 11 when the coupling of the improved extruder is assembled.

An important advantage of the improved extruder is that its coupling is less likely to damage or destroy the screw 1, even if the screw is made of a hard metal and even if the axis of the screw is not in exact alignment with the shaft 6.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An extruder, particularly for plastic materials comprising a screw having a first end portion provided with a first flat; drive means for said screw including a motion transmitting member having a second end portion provided with a second flat adjacent said first flat; and means for coupling said end portions including a first coupling element overlying and abutting said flats, a second coupling element partially surrounding said end portions, and means for fastening said coupling elements to each other.

2. The extruder of claim 1 wherein said screw is rotatable about a predetermined axis and said motion transmitting member includes a rotary shaft having an axis substantially coinciding with said predetermined axis.

3. The extruder of claim 2, wherein said fastening means is located between said end portions.

4. The extruder of claim 3, wherein one of said coupling elements has a tapped bore and said fastening means includes a fastener having a threaded shank in said bore.

5. The extruder of claim 2, wherein one of said flats is inclined with reference to said predetermined axis.

6. The extruder of claim 5, wherein said one flat is said first flat.

7. The extruder of claim 2, wherein said shaft includes an enlarged portion in the region of said second end portion and further comprising a clamping device abutting said enlarged portion and means for releasably securing said clamping device to one of said coupling elements.

8. The extruder of claim 7, wherein said enlarged portion forms part of said second end portion and said shaft has a shoulder adjacent said enlarged portion, said clamping device abutting said shoulder and said securing means including means for connecting said clamping device to said second coupling element.

9. The extruder of claim 1, wherein said motion transmitting member is rotatable about a predetermined axis and said drive means further comprises means for rotating and reciprocating said motion transmitting member.

10. The extruder of claim 1, wherein said second coupling element is substantially U-shaped.

* * * * *